United States Patent
Atwell et al.

[11] Patent Number: 6,043,806
[45] Date of Patent: Mar. 28, 2000

[54] INDUCTIVE JOYSTICK AND SIGNAL PROCESSING CIRCUIT THEREFOR

[75] Inventors: Anthony Keith Atwell, Newport; Terence Kevin Pontin, Blackwood, both of United Kingdom

[73] Assignee: Penny & Giles Controls Limited, West Sussex, United Kingdom

[21] Appl. No.: 08/930,484

[22] PCT Filed: Mar. 28, 1996

[86] PCT No.: PCT/GB96/00738

§ 371 Date: Sep. 26, 1997

§ 102(e) Date: Sep. 26, 1997

[87] PCT Pub. No.: WO96/30862

PCT Pub. Date: Oct. 3, 1996

[30] Foreign Application Priority Data

Mar. 28, 1995 [GB] United Kingdom .................... 9506264
Apr. 1, 1995 [GB] United Kingdom .................... 9506773

[51] Int. Cl.[7] ........................................................ G09G 5/08
[52] U.S. Cl. ............................................................. 345/161
[58] Field of Search .............................. 345/161; 273/148, 273/149; 200/5, 6 R, 7; 74/471, 472, 473

[56] References Cited

U.S. PATENT DOCUMENTS 5,724,068  3/1998  Sanchez et al. ......................... 345/161

*Primary Examiner*—Xiao Wu
*Assistant Examiner*—Ronald Laneau
*Attorney, Agent, or Firm*—David P. Gordon; David S. Jacobson; Thomas A. Gallagher

[57] ABSTRACT

An inductive joystick includes a movable actuator which carries an element of electrically conductive low magnetic permeability material (e.g., copper or aluminum), such that movement of the actuator differentially affects the coupling between a primary coil and a pair of secondary coils which are encircled by the primary coil. The arrangement provides a desirable output characteristic, in which the minimum output of each secondary coil is preferably greater than the maximum difference between the outputs of the two secondary coils, useful for detecting component failure. The secondary coils are preferably connected in a processing circuit which rectifies the outputs of the two coils before combining them to form a resultant "difference" output.

17 Claims, 9 Drawing Sheets

_US 6,043,806_

INDUCTIVE JOYSTICK AND SIGNAL PROCESSING CIRCUIT THEREFOR

BACKGROUND OF THE INVENTION

1. Field of the Invention

This invention relates to an inductive joystick and to a signal processing circuit for such an inductive joystick.

2. State of the Art

Inductive joysticks are known for controlling apparatus in many different applications. One such joystick is shown in FIG. 1 of the drawings and comprises an operating lever 16 having a primary induction coil 10 fixed to its lower end. A pair of fixed secondary coils 12,14 are provided for each axis of the joystick, the coils of each such pair being connected so that their outputs are in anti-phase. The primary coil 10 is provided with a sinusoidally varying supply voltage via flexing wires 11 which connect the supply (not shown) situated in the fixed portion of the joystick to the primary coil 10.

In use, the operating lever 16 is pivoted about a pivot point 9 such that the primary coil 10 is displaced relative to the secondary coils 12,14. When the operating lever 16 is in the central position, the magnetic coupling between the primary coil 10 and the secondary coils 12,14 causes equal output voltages to be induced in the two secondary coils. Because these output voltages are connected in anti-phase, they are cancelled out and there is no resultant output from each pair of secondary coils. However, if the operating lever 16 is moved, whereby the primary coil 10 is displaced relative to the secondary coils 12,14, the magnetic coupling between them is altered, and the output voltages of the two secondary coils are no longer equal. There will therefore be a resultant output from the pair of secondary coils on the axis along which the operating lever is moved. This resultant output, which is dependent upon the distance by which the primary coil 10 has been displaced from its central position relative to the secondary coils 12,14, is applied to a control system which can therefore determine the relative position of the operating lever, for appropriate control of the apparatus for which the joystick is provided.

A problem associated with the above-described arrangement is that the flexing wires 11 are subjected to fatigue action in operation. Thus, over a period of time, the wires may weaken and break, causing failure of the joystick.

Another known joystick, which overcomes the above problem, is shown in FIG. 2 and again comprises an operating lever 16, pivoted at 9, and a pair of fixed secondary coils 12, 14 for each axis of the joystick, the coils of each such pair being connected so that their outputs are in anti-phase. However, in this case, the primary induction coil 10 is fixed in the centre of the secondary coils, and all of the coils are wound on a ferromagnetic core 13. A ferromagnetic disc 15 is fixed to the lower end of the operating lever 16. When the lever 16 is in its central position above the coil arrangement, the coupling between the primary coil 10 and the respective secondary coils 12,14 causes equal output voltages to be induced in the secondary coils and the resultant output from each axis is accordingly zero. However, displacement of the operating lever 16 and thus of the ferromagnetic disc 15 causes a change in the magnetic coupling between the primary coil 10 and the secondary coils 12,14 of the axis in which the lever is moved. This in turn causes the output voltages induced in those secondary coils to be unequal and there is therefore a resultant output from the secondary coils in that axis. This resultant output is again applied to a control system which thereby determines the position of the lever 16 and appropriately controls the apparatus for which the joystick is provided.

In the arrangement shown in FIG. 2, the need for flexing wires is avoided because the primary coil is situated on the fixed portion of the joystick and may be connected directly to the supply voltage. However, the resultant output voltage versus operating lever deflection characteristic is not linear. Therefore, it is difficult to obtain accurate control of the apparatus. Another disadvantage of the above-described arrangement is that ferromagnetic material is expensive and the need for a large ferromagnetic core common to all of the coils results in a relatively costly arrangement.

We have now devised a joystick which overcomes the problems, outlined above, which are associated with known joysticks.

SUMMARY OF THE INVENTION

In accordance with the present invention, there is provided an inductive joystick, comprising a movable actuator which is provided with an element of electrically conductive material of low magnetic permeability, a pair of secondary coils for respective axes of deflection of said actuator, and a primary induction coil for inducing signals in said secondary coils, said primary induction coil being positioned to encircle said secondary coils and said actuator being arranged so that its said electrically conductive element is positioned within the magnetic field of the primary induction coil and is deflected relative to said secondary coils upon movement of said actuator.

When the electrically conductive element of the joystick actuator is placed within the magnetic field of the primary coil, electric currents (Eddy currents) are induced in that element. These currents in turn set up a magnetic field around the conductive element. When the actuator is positioned such that its conductive element is in a central position between the secondary coils, the magnetic field in the centre of the conductive element opposes the primary coil magnetic field, and the magnetic field in the region outside the conductive element reinforces the primary coil magnetic field. Thus the magnetic coupling between the primary coil and the secondary coils induces equal voltages in each of the secondary coils.

The secondary coils for the or each axis of the joystick are preferably connected to means for forming a resultant signal according to the difference between the outputs of those coils. This resultant signal is indicative of the position of the joystick actuator relative to the two secondary coils. The outputs for each axis are preferably applied to a control system which may be either integral with or external to the joystick. Therefore, when the actuator is in a central position, the output voltages from the secondary coils in each pair are cancelled out and there is no resultant output. However, if the actuator is moved along an axis such that its electrically conductive element is deflected towards one of the secondary coils of a pair, the field strength induced in that coil is reduced and its output voltage is thus also reduced. The field strength induced in the other secondary coil of the pair is accordingly increased, thus increasing its output voltage. In this case therefore, a resultant signal is formed from the outputs of that pair of secondary coils, which is representative of the distance by which the operating lever has been deflected from its central position. When this resultant signal is applied to the control system, the latter can determine the position of the actuator, for appropriate control of the apparatus being controlled.

A particular advantage of the above-defined joystick, due in particular to the use of the conductive element and the positioning of the primary coil to encircle the secondary coils, is that a desirable response characteristic can be achieved. Thus, the characteristic can be achieved wherein, in operation of the joystick, the minimum output from each secondary coil is significantly greater than the difference between the outputs of the respective pair of secondary coils. This enables certain failure modes of the joystick to be detected, as will be described below.

The electrically conductive element, which is preferably a disc and is preferably made of copper, aluminium or aluminium alloy, provides a reasonably large change in output voltage for a given deflection of the actuator, and the linearity of the resultant output signal/actuator deflection characteristic is improved. Thus the position of the actuator relative to the secondary coils may be sensed more accurately using the joystick of the present invention: further, this joystick costs significantly less than one which requires the coils to be wound on ferromagnetic cores. Another advantage of the joystick is that it requires no flexing wires.

A known signal processing circuit for known joysticks is shown in FIG. 9 of the drawings. The arrangement generally comprises a primary circuit 100 and two secondary circuits 102, 104. The primary circuit 100 comprises a primary induction coil 101 which is connected to an a.c. generator connected across a supply voltage Vs. Each of the secondary circuits 102, 104 comprises two coils e.g. 106, 108 wound in anti-phase and connected in series. The coils 106, 108 are connected to an analogue switch 112. The output of each switch 112 is applied to the inverting input of an operational amplifier 122, connected between the supply voltage rail Vs and ground (Ov) respectively. A capacitor 124 and a resistor 126 are connected in parallel with each other between the inverting input of the operational amplifier 122 and its output. The non-inverting input of the amplifier 122 is held at a reference voltage Vs/2 of half the supply voltage Vs. A second capacitor 128 is provided across the two inputs of the amplifier 122 for EMI protection.

The coils 106, 108 of each of the circuits 102, 104 are positioned at 45° to the X and Y axes respectively of the joystick. When the voltage supply Vs is switched on, the resultant alternating current in the primary induction coil 101 induces anti-phase voltages in the secondary coils 106, 108, which are combined to obtain voltages A and B. Voltages A and B are individually synchronously rectified and then summed, dc averaged and amplified to obtain an X axis output, or differenced, dc averaged and amplified to obtain a Y axis output. In particular:

Y axis output=K (A+B)

X axis output=K (A−B)

where K is the gain of the circuit, A is the output voltage from the first secondary circuit 102, and B is the output voltage from the second secondary circuit 104. Under normal operating conditions, a deflection of the joystick along the Y-axis causes the Y output to change and the X output to remain constant. However, in the event of a failure of either secondary circuit, a deflection along the Y axis causes a change of both the Y and X axis outputs:

failure of secondary circuit 102: X=K (O−B)=−KB failure of secondary circuit 104: X=K (A−O)=KA Similarly, a deflection along the X axis under failure conditions causes a change in the Y axis output. However, since both outputs are within the operating range of the circuit, the failure goes unrecognised.

Referring to FIG. 10, in an alternative prior art arrangement, the secondary coils are positioned on the X and Y axes of the joystick. In some applications, the Y-axis is used to control the forward/reverse speed of a vehicle, while the X-axis is used to control steering position. A failure in the X-axis circuit 102 would not affect the Y-axis circuit 104, so the user could select any desired forward/reverse speed up to the usual maximum speed, with no steering facility. This is clearly a dangerous situation.

We have now devised an electronic circuit which overcomes the problems outlined above, which are associated with known signal processing circuits for joysticks.

Thus, in accordance with the present invention, there is provided an electronic circuit for an inductive joystick, comprising a primary induction coil and at least one secondary circuit, the or each said secondary circuit comprising first and second coils the outputs of which are connected via respective rectifying means to a combining means to provide a resultant signal according to the difference between the outputs of said first and second coils and representing the deflection of an actuator of the joystick.

Because the two secondary coil outputs are rectified before being combined to form their resultant "difference" signal, then in the event of failure of any of the components in the or each secondary circuit, a resultant output is produced which exceeds normal operating limits. A separate safety mechanism may be actuated by the output and the operator may be alerted. This contrasts with the prior art arrangements in which the coil outputs are combined before rectification, because in these arrangements failures can occur without the resultant going outside its normal range.

The rectifying means may comprise synchronous or homodyne devices such as analogue switches. Preferably however, in order to minimise the component count and thus improve the reliability and reduce the cost of the circuit, the rectifying means comprises a diode rectifying arrangement. Preferably each secondary circuit comprises a pair of diodes, one for each of the first and second coils, formed on the same semiconductor substrate.

Diode rectifiers are inherently non-linear at low input signal amplitudes, primarily due to their forward voltage drops. A further advantage of rectifying the secondary coil outputs, prior to combining these outputs to form the resultant signal, is that the input signals to the rectifying diodes are large compared with their forward voltage drops: by contrast, if the resultant signal were formed prior to rectification, the resultant signal would be relatively small and its characteristic would therefore be more affected by the diode forward voltage drop.

The coils of each secondary circuit may be positioned on the X and Y axes of the joystick respectively. They may alternatively be positioned at 450 thereto.

Preferably the circuit is arranged such that the output under failure conditions is at least 1.2 times the normal maximum, and most preferably at least 1.5 times the normal maximum.

Embodiments of the present invention will now be described by way of examples only and with reference to the accompanying drawings.

DETAILED DESCRIPTION OF THE PREFERRED EMBODIMENTS

Figure 1:
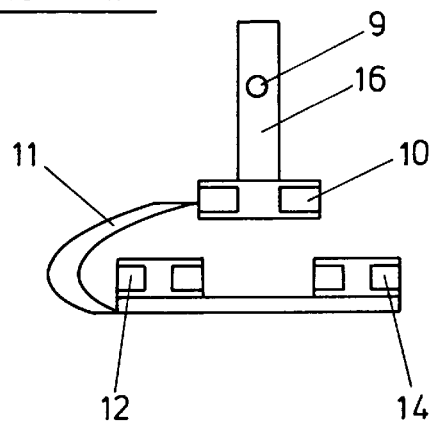
FIG. 1 is a schematic side view of a prior art inductive joystick.
Figure 2:
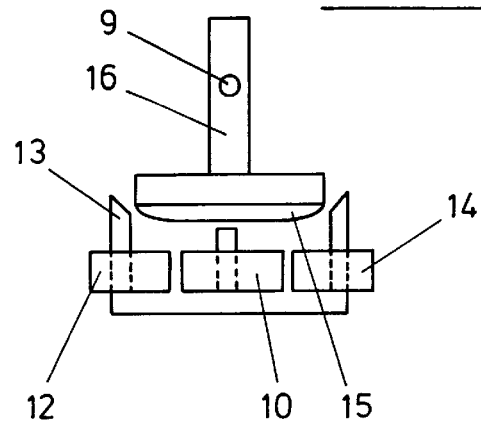
FIG. 2 is a schematic side view of another prior art inductive joystick.
Figure 3:
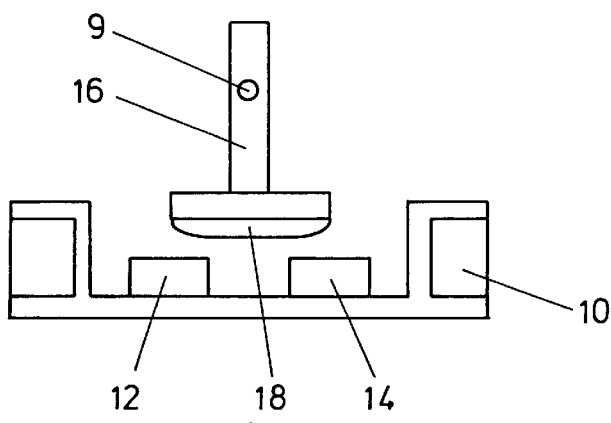
FIG. 3 is a schematic side view of an inductive joystick in accordance with the present invention.
Figure 4:
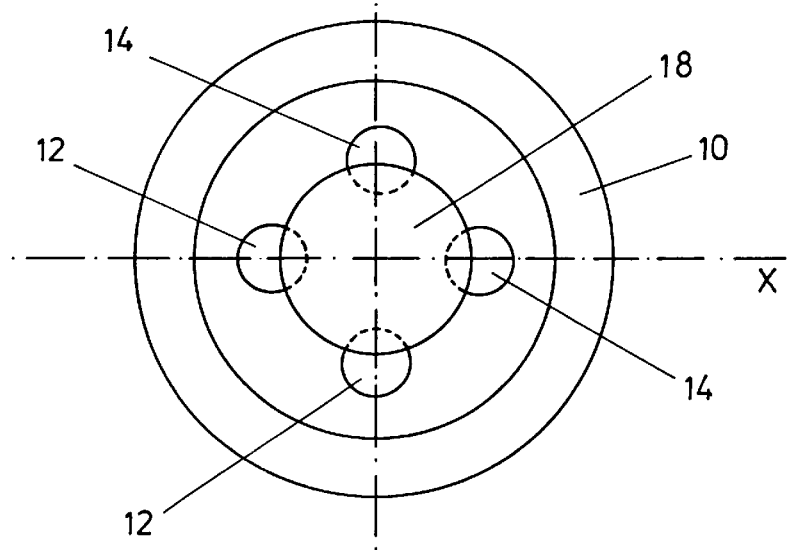
FIG. 4 is a schematic plan view of the joystick of FIG. 3.

Referring to FIG. 3 of the drawings, an inductive joystick according to the present invention comprises an outer, generally annular primary induction coil 10, and a pair of secondary coils 12, 14 for each axis of the joystick, the secondary coils being encircled by the primary coil 10. In the case that the joystick is to control an apparatus via two axes—an X-axis and a Y-axis—two pairs of secondary coils 12,14 are necessary, as shown in FIG. 4. The secondary coils 12,14 for each axis are connected such that their outputs are in anti-phase. All of the coils 10, 12, 14 are fixed, and the primary induction coil is connected to a supply voltage (not shown) which may be positioned in any convenient position. Referring back to FIG. 3, the joystick further comprises an operating lever 16 having a disc 18 of electrically conductive material of low magnetic permeability, for example copper, fixed to its lower end. The lever 16 is pivotally mounted at a point 9 in a generally central position above the secondary coils 12, 14.

When the supply voltage to the primary induction coil 10 is switched on, then if the electrically conductive disc 18 were absent, the magnetic coupling between the primary coil 10 and the secondary coils 12,14 would cause equal voltages to be induced in those secondary coils. With the conductive disc 18 introduced into the magnetic field of the primary coil 10, electric currents are induced within the disc. These currents set up a magnetic field around the conductive disc 18. The magnetic field in the centre of the disc opposes the primary coil magnetic field, while the magnetic field in the region outside the disc reinforces the primary coil magnetic field. Thus, when the operating lever 16 is in its central position, the magnetic field respectively in and around the electrically conductive disc 18 has an opposite effect on the primary coil magnetic field, the voltages induced in the secondary coils are equal and, because the secondary coils 12, 14 of each pair are connected such that their outputs are in anti-phase, they cancel each other out such that there is no resultant output signal.

Figure 5:
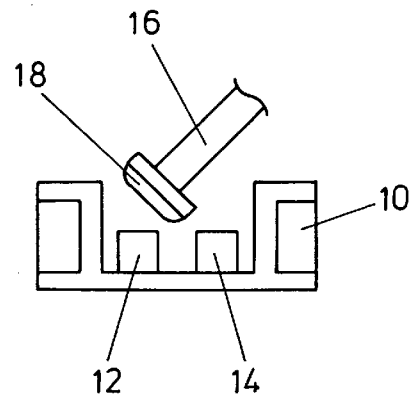
FIG. 5 is a view of the joystick of FIG. 3 when the operating lever is deflected in one direction.
Figure 6:
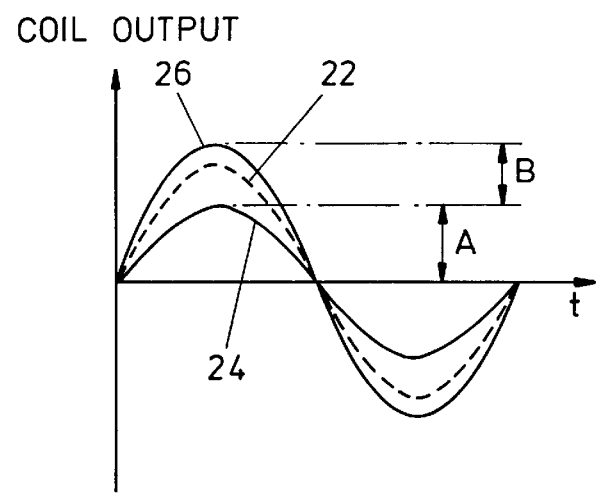
FIG. 6 is a graphical representation of the secondary coil output when the operating lever is in the position shown in FIG. 5.

Referring to FIG. 5 of the drawings, in use, if the operating lever 16 is moved by an operator to deflect the electrically conductive disc 18 towards one of the secondary coils 12 of a pair, the field strength induced in that coil 12 is reduced due to the opposing effect of the magnetic field at the centre of the electrically conductive disc 18, and the voltage induced in the coil 12 is reduced accordingly. Similarly, the field strength and therefore the voltage induced in the opposite coil 14 is increased due to the reinforcing effect of the magnetic field in the region outside the electrically conductive disc 18. The outputs from the coils 12, 14 are shown in graphical form in FIG. 6. Curve 22 represents the output voltage of each coil when the operating lever is in the central position, and curves 24 and 26 represent the output voltages of coils 12 and 14 respectively when the operating lever is in the position shown in FIG. 5. As the outputs from the coils are no longer equal, there is a resultant output signal which is representative of the distance by which the lever 16 has been deflected along the respective axis.

Figure 7:
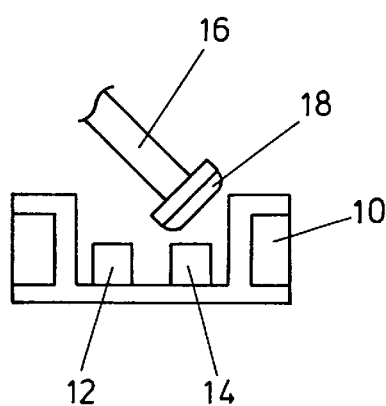
FIG. 7 is a view of the joystick of FIG. 3 when the operating lever is deflected in the opposite direction.
Figure 8:
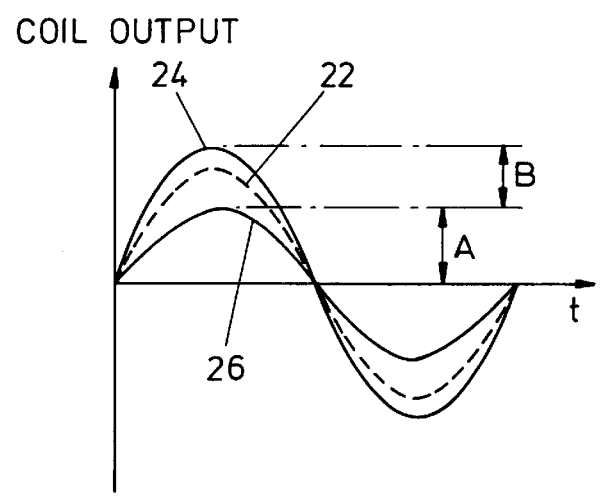
FIG. 8 is a graphical representation of the secondary coil output when the operating lever is in the position shown in FIG. 7.

Referring to FIG. 7 of the drawings, if the operating lever 16 is deflected towards the secondary coil 14, the field strength and therefore the voltage induced in that secondary coil is reduced, while the field strength and therefore the voltage induced in the opposing secondary coil 12 is increased. This can be seen more clearly in FIG. 8 in which curve 22 again represents the output voltages of each coil 12, 14 when the operating lever 16 is in the central position, and curves 24 and 26 represent the output voltages of coils 12 and 14 respectively when the operating lever 16 is in the position shown in FIG. 7.

The arrangement described provides the characteristic that the minimum output (A) from coil 12 at maximum deflection of the operating lever 16, as shown in FIG. 5 or 7, is greater than the maximum difference (B) between the outputs of the two coils: this ensures that certain failure modes of the joystick can be detected. It has been found convenient to design the arrangement such that $A \geq 1.5B$. The resultant output signal is applied to a control system which determines the position of the operating lever and accordingly controls the apparatus for which the joystick is provided.

Figure 11:
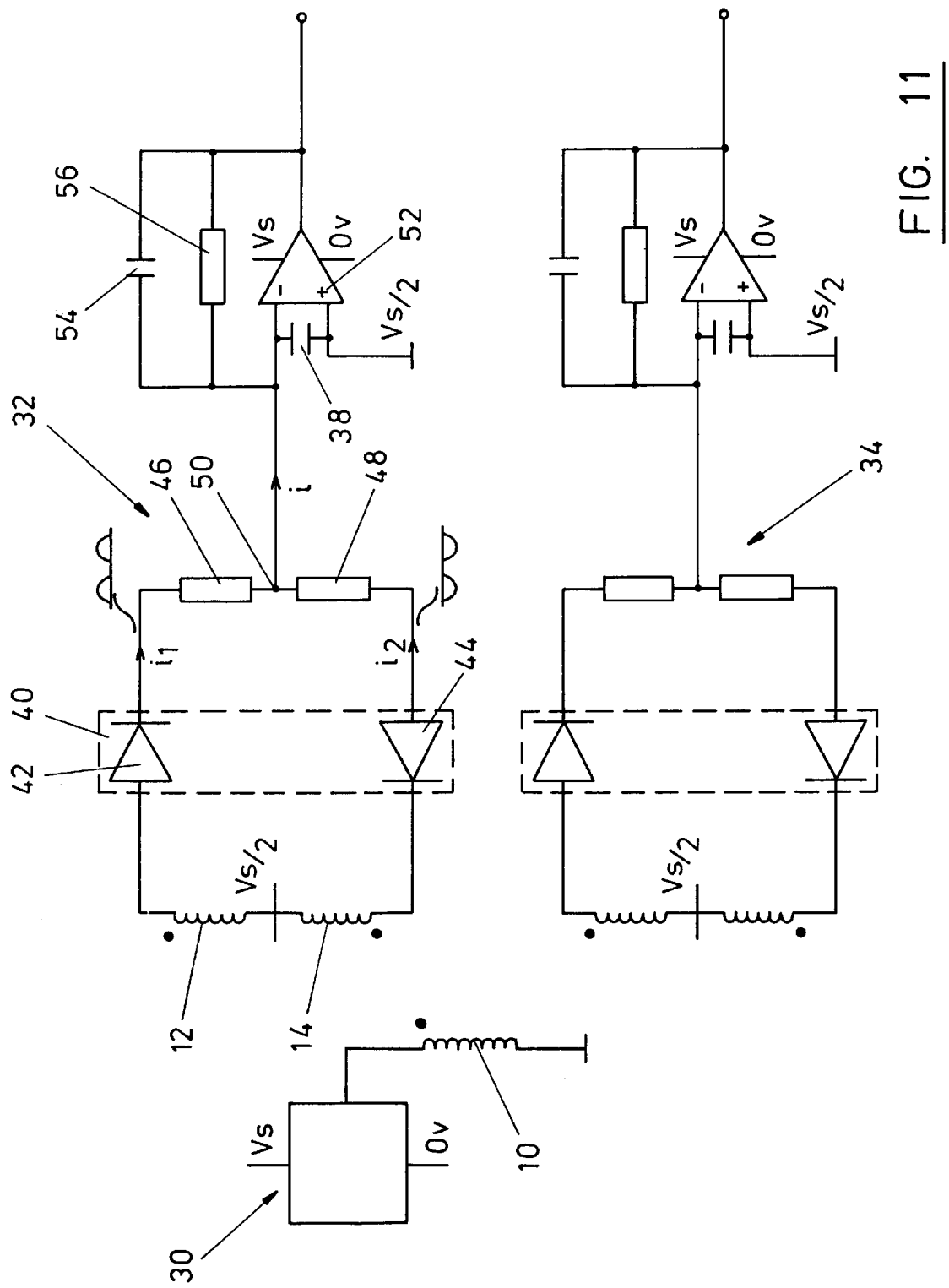
FIG. 11 is a diagram of a first embodiment of electronic circuit in accordance with the present invention.

Referring to FIG. 11 of the drawings, there is shown an electronic signal processing circuit which may be used with the joystick described above with reference to FIGS. 3 to 8, and comprising a primary circuit 30 and two identical secondary circuits 32,34. The primary circuit 30 comprises a primary induction coil 10 which is driven by an a.c. generator connected across a supply voltage Vs. Each of the secondary circuits 32,34 comprises two coils 12,14 which are wound such that their output voltages are in anti-phase to reduce ripple at the output. The coils 12,14 are connected across the inputs of a silicon chip 40, comprising two opposing diodes 42,44 formed on the same silicon substrate. By using diodes which form part of the same silicon chip, it is possible to ensure that the forward voltage drop and the temperature coefficient are matched for the two diodes. This also ensures that both diodes are at the same temperature. The outputs of the two diodes 42,44 are combined, via resistors 46,48, so as to form a summing junction 50. The output of the summing junction is applied to the inverting input of an operational amplifier 52, connected between the supply voltage rail Vs and ground. A capacitor 54 (for d.c. averaging or smoothing) and a resistor 56 are connected in parallel with each other between the inverting input of the operational amplifier 52 and its output. The non-inverting input of the amplifier 52 is held at a reference voltage Vs/2 of half the supply voltage Vs. A second capacitor 38 is provided across the two inputs of the amplifier 52 for EMI protection.

The coils 12,14 of each of the secondary circuits 32,34 are positioned on the X and Y axes respectively of the joystick. The operation of the secondary circuits 32,34 will now be described with reference to the first secondary circuit 32 only, but applies equally to the second secondary circuit 34. When the voltage supply Vs is switched on, the resultant alternating current in the primary induction coil 10 induces an alternating voltage in each of the secondary coils 12,14.

If the coils 12,14 are identical, the alternating voltages induced in the two coils, which are oppositely phased but centred around half of the supply voltage Vs/2, are equal when the joystick is in its centre position along the X axis.

During the positive half-cycle of the output voltage of coil 12, the first diode 42 conducts to give a current having a dc average $i_1$: during the negative half-cycles of the output voltage of coil 14, the second diode 44 conducts to give a current having a dc average $i_1$. Thus the currents from each of the coils 12,14 enter the summing junction 50 in antiphase. With the joystick in the centre position, the magnitudes of $i_1$ and $i_2$ are equal and will, therefore, cancel each other out at the summing junction 50. In these circumstances, no current flows from the summing junction to the inverting input of the operational amplifier 52 and there is thus no resultant output signal.

When the joystick is deflected along the X axis, there is an imbalance between the currents $i_1$ and $i_2$ flowing in the secondary circuit 32 and a resultant current having a dc average i flows from the summing junction 50. For example, if the joystick is deflected in the X-axis in a positive direction, an imbalance between the currents $i_1$ and $i_2$ is created in the secondary circuit 32 and a current i, the magnitude of which is equal to the difference between the magnitudes of $i_1$ and $i_2$, flows from the summing junction 50 to the inverting input of the operational amplifier 52 of that circuit 32. Thus the output voltage of the X-axis secondary circuit 32 under normal operating conditions may be expressed as:

$$V_{out} \alpha\ i\ \text{where}\ i=(i_1-i_2)$$

A suitable external controller (not shown) detects the outputs of the operational amplifier 52 for each axis and responds accordingly.

The maximum value of i, in secondary circuit 32 or 34, occurs when the joystick is at its maximum deflection along the X or the Y axis, respectively. Thus, under normal operating conditions, the output from the secondary circuits 32, 34 will never exceed a maximum Vout, which is proportional to i maximum, i.e:

$$o \leq i \leq i\ \text{maximum}$$

The secondary circuits 32, 34 are arranged such that:

$$i_1 > i\ \text{maximum},$$

and $$i_2 > i\ \text{maximum}$$

in each case. Therefore, in the event of an open circuit failure of, for example, coil 12, diode 42 or resistor 46, il is zero and i=$i_2$. The output voltage from operational amplifier 52 is then proportional to $i_2$ which is detected by the controller as being out of range from normal operating conditions. In the event of a short circuit failure of, for example, diode 42, the full ac waveform is passed. The dc average of the ac waveform is zero and $i_1$ is therefore zero. Thus i=$i_2$ and the output voltage of the operational amplifier 52 is again proportional to $i_2$, which results in a resultant output signal which is outside the normal operating limits.

The circuits 32,34 may be designed such that:

$$i_1 > 1.5\ i\ \text{maximum},$$

and $$i_2 > 1.5\ i\ \text{maximum},$$

respectively.

Figure 12:
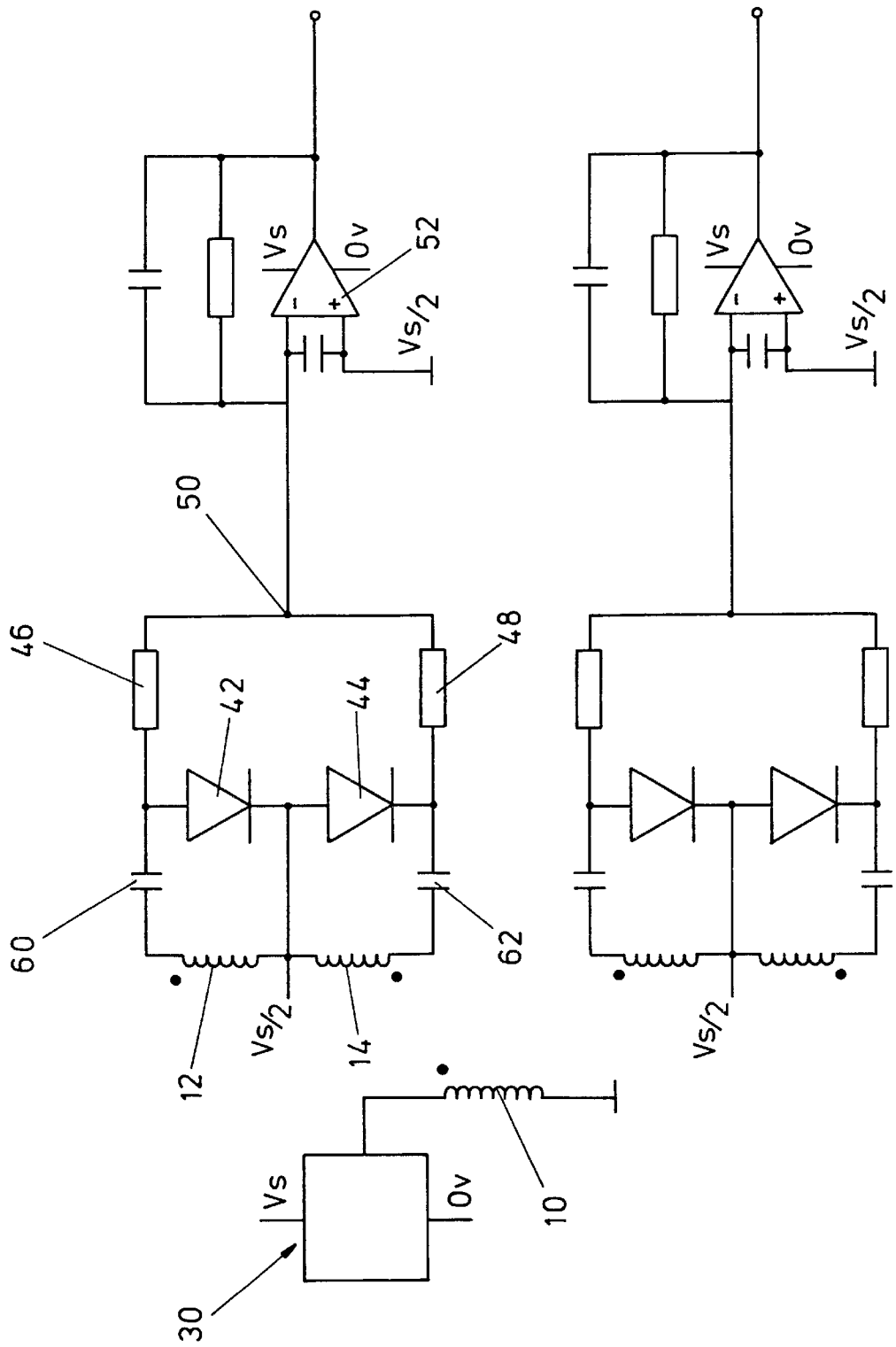
FIG. 12 is a diagram of a second embodiment of electronic circuit in accordance with the present invention.

Referring to FIG. 12 of the drawings, in a modified circuit, the diodes 42,44 are connected in parallel across their associated coils 16, 18 respectively, and capacitors 60,62 are connected in series with each coil 12,14 so forming respective voltage doubler and rectifying circuits.

Figure 9:
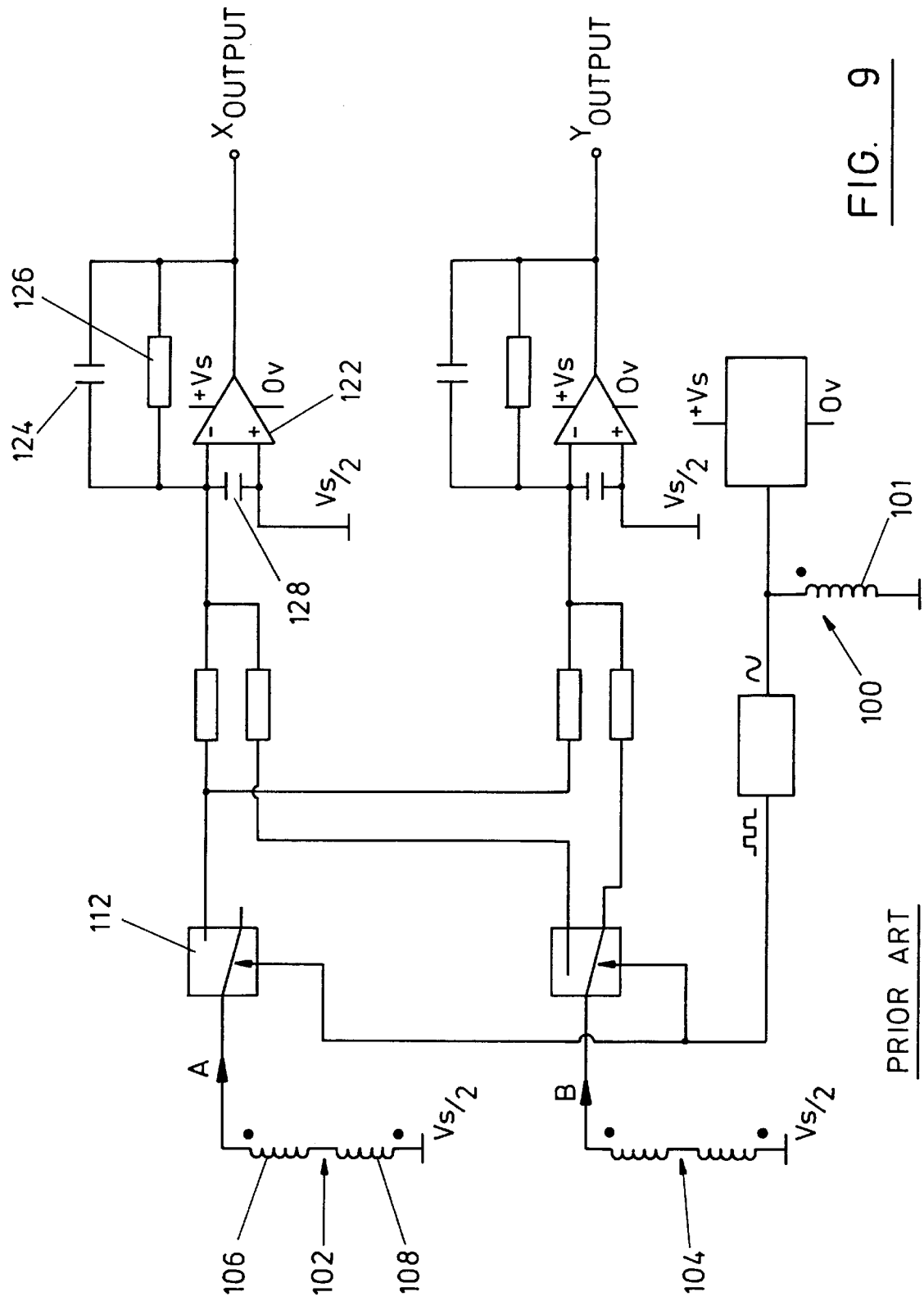
FIG. 9 is a diagram of a prior art electronic signal processing circuit for an inductive joystick.
Figure 10:
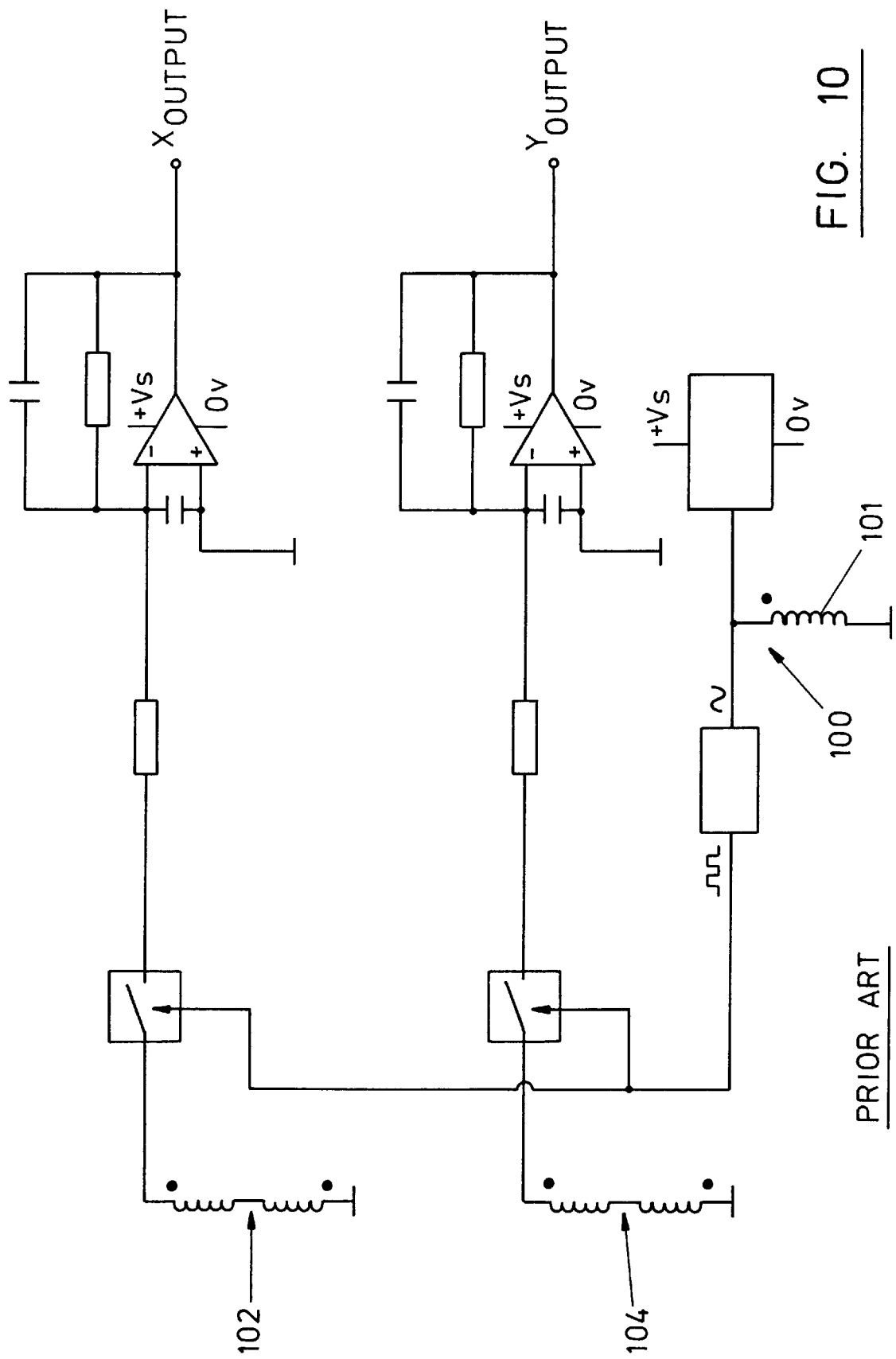
FIG. 10 is a diagram of an alternative prior art signal processing circuit for an inductive joystick.
Figure 13:
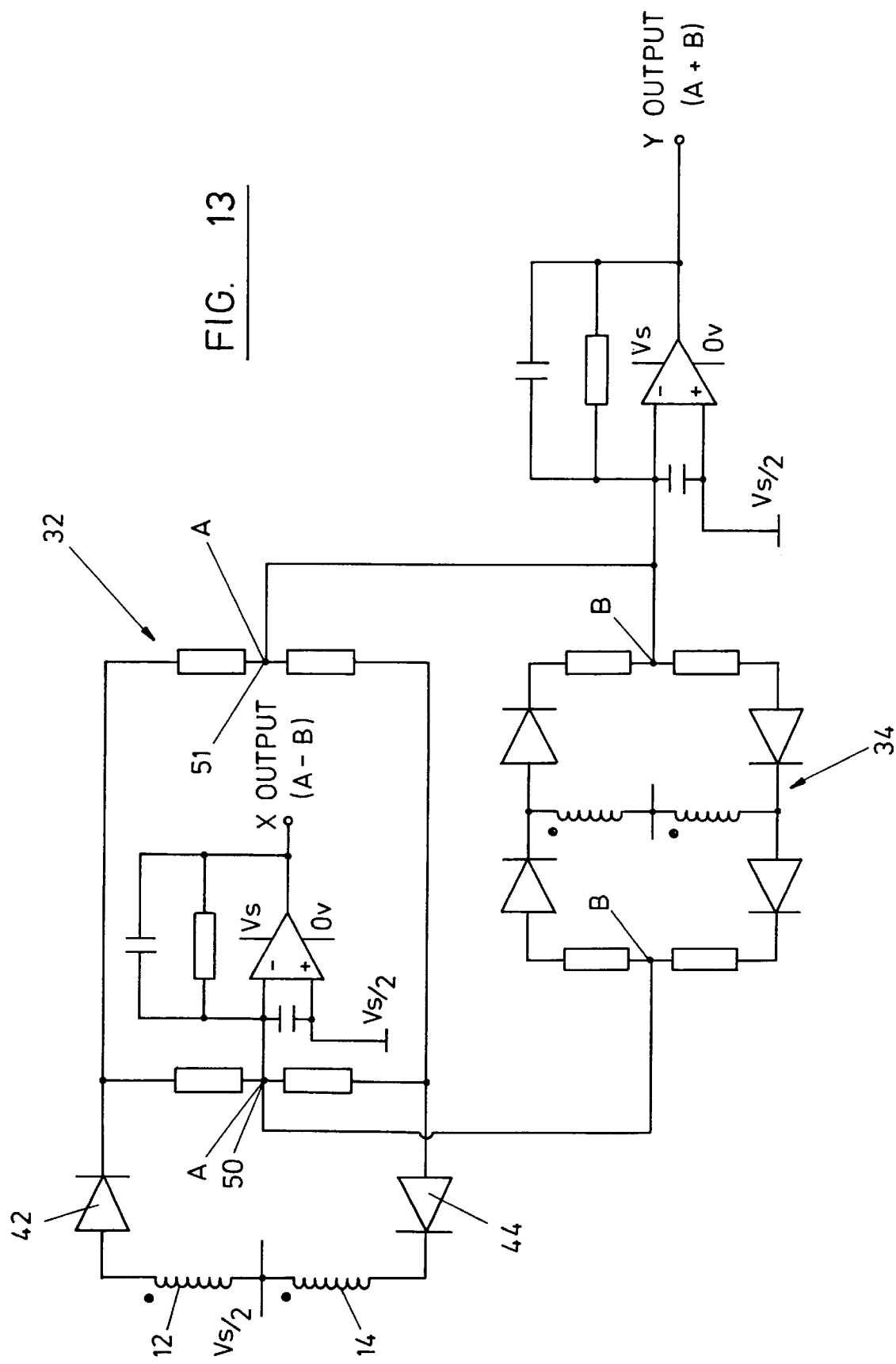
FIG. 13 is a diagram of a third embodiment of electronic circuit in accordance with the present invention.

Referring to FIG. 13 of the drawings, in another embodiment, the circuit is arranged such that each of the secondary coils lies at 45° to the X, Y axes of the inductive joystick (similar to the circuit of FIG. 9). The circuit 32 has a second summing junction 51 and both its summing junctions provide outputs A: circuit 34 similarly has a second summing junction formed by a second set of diodes and resistors, the two summing junctions providing outputs B and −B respectively. The outputs at the respective summing junctions of the two circuits 32,34 are combined to produce a Y output K (A+B), and an X output K (A−B).

Figure 14:
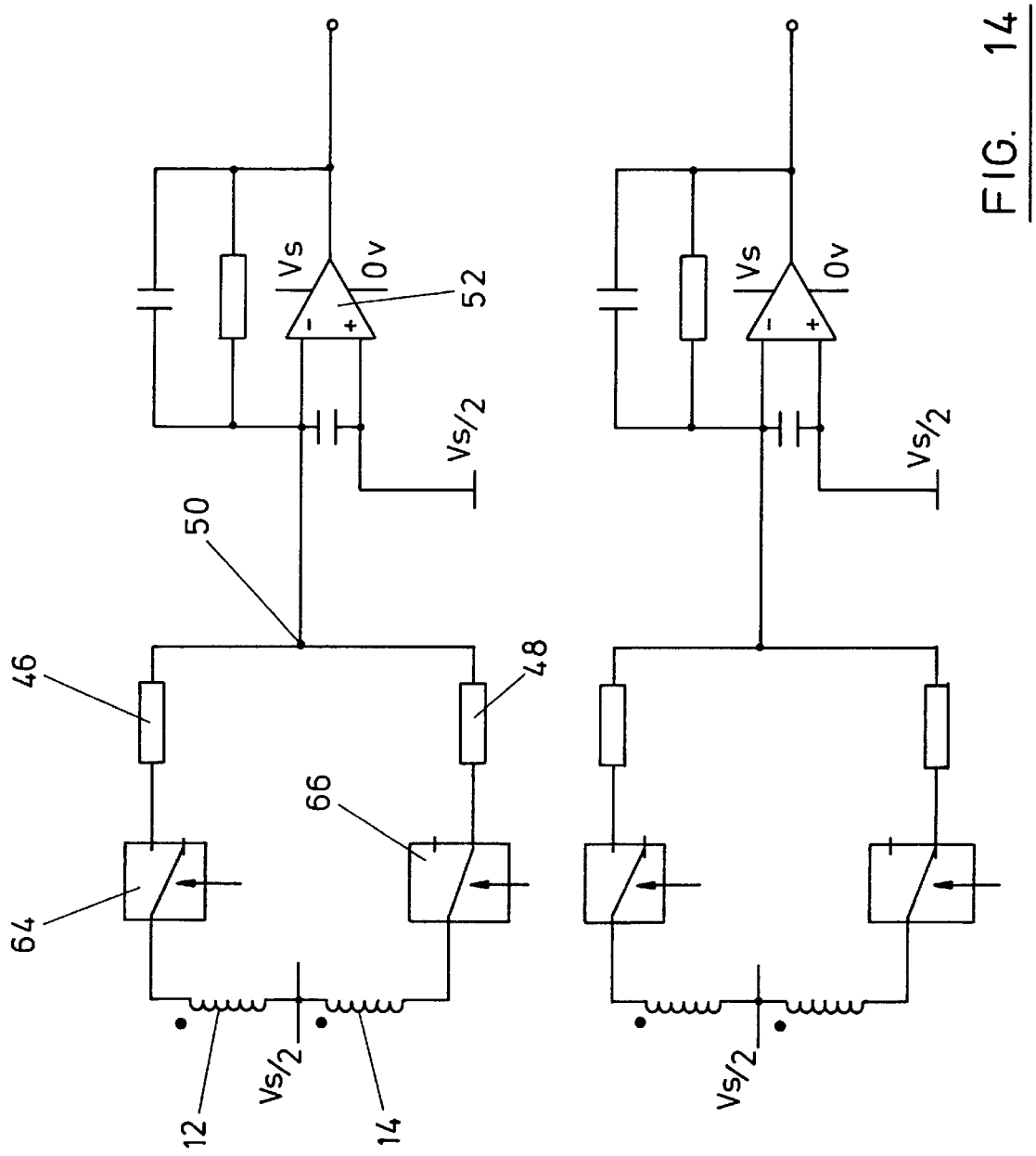
FIG. 14 is a diagram of a fourth embodiment of electronic circuit in accordance with the present invention.

Referring to FIG. 14 of the drawings, the diodes e.g. 42,44 in the secondary circuits 32,34 of FIGS. 11, 12 and 13 may be replaced by any other suitable rectifying components, for example, analogue switches 64,66 operated synchronously with the drive signal to the primary coil.

Figure 15:
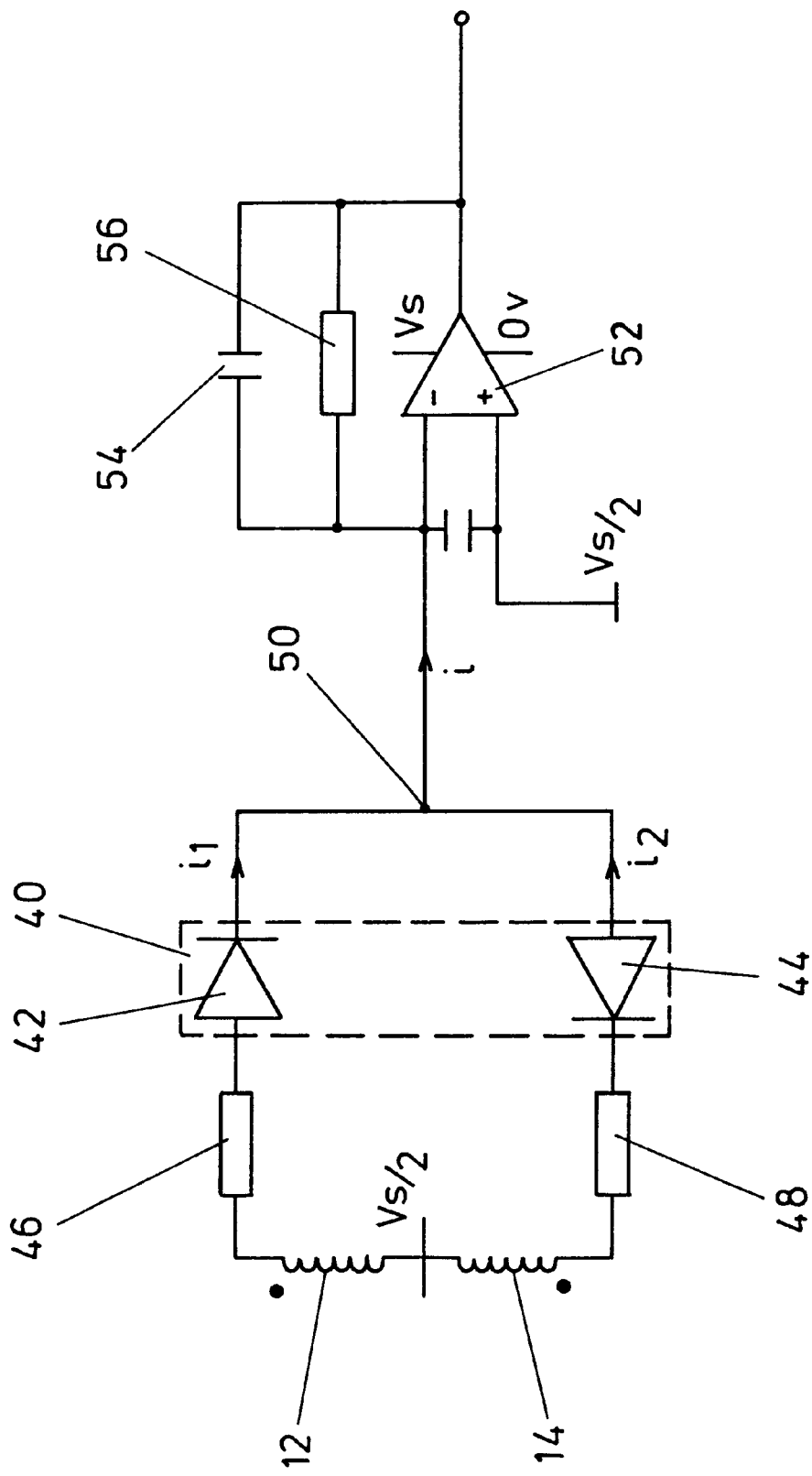
FIG. 15 is a diagram of one of the secondary circuits of FIG. 11 having an alternative construction.

It will be appreciated that the positions of certain components within the electronic circuit in accordance with the present invention may be interchanged. Thus, for example as shown in FIG. 15 for the secondary circuit 32 only, the positions of the diodes 42,44 may be interchanged with those of the resistors 46,48 respectively. This is advantageous in many circumstances because the board on which can the circuit is mounted displays inherent stray capacitance which can form RC filters with the resistors 46,48 and thus eliminate high frequency signals from the coil signals prior to rectification.

We claim:

1. An inductive joystick, comprising a movable actuator which is provided with an element of electrically conductive material of low magnetic permeability, a pair of secondary coils for respective axes of deflection of said actuator, and a primary induction coil for inducing signals in said secondary coils, said primary induction coil being positioned to encircle said secondary coils and said actuator being arranged so that its said electrically conductive element is positioned within the magnetic field of the primary induction coil and is deflected relative to said secondary coils upon movement of said actuator.

2. An inductive joystick as claimed in claim 1, in which said electrically conductive element comprises a material selected from copper, aluminium and aluminium alloy.

3. An inductive joystick as claimed in claim 1, in which said electrically conductive element is in the form of a disc.

4. An inductive joystick as claimed in claim 1, in which said actuator is pivotal around a point on the axis of said primary induction coil.

5. An inductive joystick as claimed in claim 1, comprising means connected to each said pair of secondary coils to form a resultant signal according to the difference between the outputs of those coils.

6. An inductive joystick as claimed in claim 5, arranged such that the minimum output of each said secondary coil is greater than the maximum difference between the outputs of the pair of secondary coils.

7. An inductive joystick as claimed in claim 6, arranged such that the minimum output of each said secondary coil is at least 1.5 times the maximum difference between the outputs of the pair of secondary coils.

8. An electronic circuit for an inductive joystick, comprising a primary induction coil and at least one secondary circuit, said secondary circuit including a first coil and a second coil, said first coil having a first output and said second coil having a second output, a first rectifying means connected to said first output and providing a first rectified signal, a second rectifying means connected to said second output and providing a second rectified signal, and combining means connected to said first and second rectifying means for receiving said first and second signals and providing a resultant signal according to the difference between said first and second rectified signals and representing the deflection of an actuator of said joystick, each of said first and second rectified signals being greater than the maximum differences between said first and second rectified signals in the absence of a fault in said at least one secondary circuit.

9. An electronic circuit as claimed in claim 8, in which the respective rectifying means are connected in series on respective paths from the first and second coils to said combining means.

10. An electronic circuit as claimed in claim 8, in which the respective rectifying means are connected in shunt on respective paths from the first and second coils to said combining means.

11. An electronic circuit as claimed in claim 8, in which the respective rectifying means comprise diodes.

12. An electronic circuit as claimed in claim 11, in which said diodes are formed on a common semiconductor substrate.

13. An electronic circuit as claimed in claim 8, in which the respective rectifying means comprise analogue switches.

14. An electronic circuit as claimed in claim 8, comprising two said secondary circuits, the two coils of the respective secondary circuits being positioned on orthogonal X and Y axes such that the resultant outputs of the respective secondary circuits represent the deflection of said joystick actuator along said X and Y axes respectively.

15. An electronic circuit as claimed in claim 8, comprising two said secondary circuits, the two coils of the respective secondary circuits being positioned on axes positioned at 45° to orthogonal X and Y axes, and means to combine the resultant outputs of the respective secondary circuits to provide signals representing the deflection of said joystick actuator along said X and Y axes respectively.

16. An electronic circuit as claimed in 8, wherein:

in the absence of a fault in said at least one secondary circuit, each of said first and second rectified signals is at least 1.5 times the maximum difference between said first and second rectified signals.

17. An inductive joystick, comprising:

a movable actuator which is provided with an element of electrically conductive material of low magnetic permeability, a pair of secondary coils for respective axes of deflection of said actuator, and a primary induction coil for inducing signals in said secondary coils, said primary induction coil being positioned to encircle said secondary coils, and said actuator being arranged so that said element is positioned within a magnetic field of said primary induction coil and is deflected relative to said secondary coils upon movement of said actuator, said pair of secondary coils being included in an electronic circuit having a combining means and a pair of rectifying means connecting the outputs of the respective secondary coils to said combining means, said combining means providing a resultant signal according to the difference between the outputs of said pair of secondary coils and representing the deflection of said actuator.

* * * * *